(12) United States Patent
Kimoto et al.

(10) Patent No.: US 11,579,587 B2
(45) Date of Patent: Feb. 14, 2023

(54) AUTOMATIC PROGRAM-CORRECTION DEVICE, AUTOMATIC PROGRAM-CORRECTION METHOD, AND AUTOMATIC PATH-GENERATION DEVICE

(71) Applicant: FANUC CORPORATION, Yamanashi (JP)

(72) Inventors: Yuuki Kimoto, Yamanashi (JP); Yoshiharu Nagatsuka, Yamanashi (JP); Toshiya Takeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 89 days.

(21) Appl. No.: 16/595,788

(22) Filed: Oct. 8, 2019

(65) Prior Publication Data

US 2020/0133276 A1 Apr. 30, 2020

(30) Foreign Application Priority Data

Oct. 31, 2018 (JP) .............................. JP2018-204910

(51) Int. Cl.
*G05B 19/4061* (2006.01)
*B25J 9/16* (2006.01)
*G05D 1/02* (2020.01)

(52) U.S. Cl.
CPC ........ *G05B 19/4061* (2013.01); *B25J 9/1666* (2013.01); *B25J 9/1671* (2013.01); *G05D 1/02* (2013.01); *G05B 2219/40476* (2013.01)

(58) Field of Classification Search
CPC ...... B25J 9/1656; B25J 9/1664; B25J 9/1666; B25J 9/1671; B25J 9/1676;
(Continued)

(56) References Cited

U.S. PATENT DOCUMENTS 6,157,902 A * 12/2000 Hirata ..................... G06T 17/00
703/7
8,700,307 B1 * 4/2014 Zhao ..................... B25J 9/1666
701/301
(Continued)

FOREIGN PATENT DOCUMENTS

DE 102015102399 B4 8/2016
EP 1752847 A2 2/2007
(Continued)

OTHER PUBLICATIONS

Wikipedia article, "Kat-5 (vehicle)", Old revision dated Sep. 5, 2018, 3 pages (Year: 2018).*
(Continued)

*Primary Examiner* — David A Testardi
(74) *Attorney, Agent, or Firm* — Karceski IP Law, PLLC

(57) ABSTRACT

An automatic program-correction device includes: a clearance detecting unit that detects an amount of clearance between a robot and a peripheral device in an operation program; a near-miss detecting unit that detects a near-miss section; a closest-point detecting unit that detects a pair of closest points, in the near-miss section; and a program updating unit that generates a new operation program having an intermediate teaching point to which the closest points have been moved, along a straight line passing through the detected pair of closest points, until the amount of clearance becomes greater than a minimum amount of clearance and equal to or less than the threshold. While gradually reducing, from the threshold, the amount of clearance at the intermediate teaching point, the program updating unit obtains an intermediate teaching point that provides a maximum amount of clearance at which a new near-miss section is not detected.

3 Claims, 5 Drawing Sheets

(58) Field of Classification Search
CPC ...... G05B 19/4061; G05B 2219/40317; G05B 2219/40476; G05B 2219/40477
See application file for complete search history.

(56) References Cited

U.S. PATENT DOCUMENTS

| | | | |
|---|---|---|---|
| 9,993,923 B2 | 6/2018 | Terada | |
| 10,525,594 B2* | 1/2020 | Ogata | B25J 9/1666 |
| 2005/0192749 A1* | 9/2005 | Flann | G01C 21/005 |
| | | | 701/301 |
| 2005/0224479 A1* | 10/2005 | Watanabe | G05B 19/4061 |
| | | | 219/125.1 |
| 2006/0041325 A1* | 2/2006 | Naganawa | G05B 19/4061 |
| | | | 700/63 |
| 2006/0176001 A1* | 8/2006 | Haunerdinger | G05B 19/4061 |
| | | | 318/573 |
| 2006/0271898 A1* | 11/2006 | Kitamura | G06F 30/394 |
| | | | 716/129 |
| 2007/0021868 A1 | 1/2007 | Nagatsuka et al. | |
| 2007/0064534 A1* | 3/2007 | Kitamura | G06F 30/394 |
| | | | 367/72 |
| 2007/0219720 A1* | 9/2007 | Trepagnier | G05D 1/0278 |
| | | | 701/300 |
| 2008/0125893 A1* | 5/2008 | Tilove | B25J 9/1666 |
| | | | 700/103 |
| 2010/0087948 A1* | 4/2010 | Yamaguchi | G05B 19/4069 |
| | | | 703/7 |
| 2010/0168950 A1 | 7/2010 | Nagano | |
| 2011/0087373 A1 | 4/2011 | Nagatsuka et al. | |
| 2011/0257778 A1* | 10/2011 | Takahashi | G05B 19/4069 |
| | | | 700/104 |
| 2013/0317646 A1* | 11/2013 | Kimoto | G05B 19/425 |
| | | | 700/250 |
| 2014/0277737 A1* | 9/2014 | Sekiyama | G05B 19/425 |
| | | | 700/259 |
| 2015/0100194 A1* | 4/2015 | Terada | G05D 1/0214 |
| | | | 701/25 |
| 2015/0239121 A1 | 8/2015 | Takeda | |
| 2016/0008979 A1* | 1/2016 | Kirsten | B25J 9/1676 |
| | | | 700/255 |
| 2016/0059413 A1* | 3/2016 | Ogata | B25J 9/1666 |
| | | | 700/186 |
| 2017/0072490 A1* | 3/2017 | Hamada | B23H 7/26 |
| 2017/0120447 A1* | 5/2017 | Inoue | B25J 9/1666 |
| 2017/0129100 A1* | 5/2017 | Takeda | B25J 9/1605 |
| 2017/0269571 A1* | 9/2017 | Pitz | G05B 19/21 |
| 2018/0059682 A1* | 3/2018 | Thode | B60W 40/105 |
| 2018/0200887 A1* | 7/2018 | Geissdorfer | B25J 9/1666 |
| 2018/0250819 A1* | 9/2018 | Miyakoshi | B25J 9/1666 |
| 2018/0290304 A1* | 10/2018 | Inoue | G05B 19/4202 |
| 2019/0161274 A1* | 5/2019 | Paschall, II | B65G 1/0492 |
| 2019/0202056 A1* | 7/2019 | Xiong | B25J 9/1666 |
| 2019/0240833 A1* | 8/2019 | Kimura | B25J 9/0081 |
| 2020/0139545 A1* | 5/2020 | Hayashi | B25J 9/1697 |
| 2020/0324413 A1* | 10/2020 | Lin | G05D 1/0214 |
| | | | 701/25 |

FOREIGN PATENT DOCUMENTS

| | | | | |
|---|---|---|---|---|
| EP | 1921526 A1 | | 5/2008 | |
| EP | 2993542 A2 | | 3/2016 | |
| JP | 05134732 A | * | 6/1993 | .......... G05D 1/0214 |
| JP | 05228860 A | * | 9/1993 | |
| JP | H05228860 A | | 9/1993 | |
| JP | H11207669 A | | 8/1999 | |
| JP | H11226886 A | | 8/1999 | |
| JP | 2003094365 A | * | 4/2003 | |
| JP | 2006190228 A | * | 7/2006 | |
| JP | 2006190228 A | | 7/2006 | |
| JP | 2007136671 A | | 6/2007 | |
| JP | 2009226561 A | | 10/2009 | |
| JP | 2010155328 A | | 7/2010 | |
| JP | 2011161549 A | | 8/2011 | |
| JP | 2012056063 A | | 3/2012 | |
| JP | 2015160277 A | | 9/2015 | |
| JP | 2016049601 A | | 4/2016 | |
| JP | 2017087300 A | | 5/2017 | |
| WO | 2008031700 A1 | | 3/2008 | |
| WO | 2013140236 A1 | | 9/2013 | |
| WO | WO-2015040980 A1 | * | 3/2015 | ......... G05B 19/4061 |
| WO | WO-2019166518 A1 | * | 9/2019 | .......... G05D 1/0214 |

OTHER PUBLICATIONS

Hassani, Imen et al., "Robot Path Planning with Avoiding Obstacles in Known Environment Using Free Segments and Turning Points Algorithm", Mathematical Problems in Engineering, Hindawi, vol. 2018, Article ID 2163278, 13 pages (Year: 2018).*

Defense Industry Daily, "Drivers not wanted: DARPA's Grand Challenge 2005 winners", Oct. 11, 2005, 4 pages, downloaded from https://www.defenseindustrydaily.com/drivers-not-wanted-darpas-grand-challenge-2005-winners-01320/ (Year: 2005).*

Olsen, Stefanie, "The pit crews behind DARPA's robot race", CNET Roadshow, Jun. 5, 2007, 6 pages, downloaded from https://www.cnet.com/roadshow/news/the-pit-crews-behind-darpas-robot-race/ (Year: 2007).*

JPO machine translation of JP 2003-94365 A (original JP document published Apr. 3, 2003) (Year: 2003).*

EPO English machine translation of JPWO 2015/040980 A1 (original Japanese translation of WO Int'l. publication published Mar. 26, 2015) (Year: 2015).*

Japanese Notice of Reasons for Refusal dated Nov. 4, 2020, for Japanese Patent Application No. 2018204910.

Japanese Search Report by Registered Search Organization dated Oct. 28, 2020, for Japanese Patent Application No. 2018204910.

German Office Action dated Apr. 26, 2022, for German Patent Application No. 10 2019 128 443.0.

* cited by examiner

AUTOMATIC PROGRAM-CORRECTION DEVICE, AUTOMATIC PROGRAM-CORRECTION METHOD, AND AUTOMATIC PATH-GENERATION DEVICE

CROSS-REFERENCE TO RELATED APPLICATION(S)

This application is based on and claims priority to Japanese Patent Application No. 2018-204910, filed on Oct. 31, 2018, the entire content of which is incorporated herein by reference.

FIELD OF THE INVENTION

The present invention relates to an automatic program-correction device, an automatic program-correction method, and an automatic path-generation device.

BACKGROUND OF THE INVENTION

In the related art, there is a known operation-program generation method for detecting a near miss between a robot and a peripheral object and for moving, if a near miss has occurred, a motion path of the robot to a position where a near miss does not occur (for example, see Japanese Unexamined Patent Application, Publication No. 2006-190228).

SUMMARY OF THE INVENTION

One aspect of the present invention is directed to an automatic program-correction device including: a clearance detecting unit that detects, at each position in a motion path of a robot set in an existing operation program, an amount of clearance between the robot and a peripheral device; a near-miss detecting unit that detects a near-miss section in which the detected amount of clearance is less than a predetermined threshold; a closest-point detecting unit that detects a pair of closest points having a minimum amount of clearance therebetween, in the detected near-miss section; and a program updating unit that generates a new operation program having an intermediate teaching point at a position to which the closest points have been moved, along a straight line passing through the detected pair of closest points, until the amount of clearance becomes greater than the minimum amount of clearance and equal to or less than the threshold, wherein, while gradually reducing, from the threshold, the amount of clearance at the intermediate teaching point, the program updating unit obtains an intermediate teaching point that provides a maximum amount of clearance at which a new near-miss section is not detected.

Another aspect of the present invention is directed to an automatic program-correction device including: a processor; and a memory, wherein the processor detects, at each position in a motion path of a robot set in an existing operation program, an amount of clearance between the robot and a peripheral device; detects a near-miss section in which the detected amount of clearance is less than a predetermined threshold stored in the memory; detects a pair of closest points having a minimum amount of clearance therebetween, in the detected near-miss section; sets an intermediate teaching point to which the closest points have been moved, along a straight line passing through the detected pair of closest points, until the amount of clearance becomes equal to the threshold; and, while gradually reducing, from the threshold, the amount of clearance at the intermediate teaching point, generates a new operation program that has an intermediate teaching point that provides a maximum amount of clearance at which a new near-miss section is not detected.

Another aspect of the present invention is directed to an automatic program-correction method including the steps of: detecting, at each position in a motion path of a robot set in an existing operation program, an amount of clearance between the robot and a peripheral device; detecting a near-miss section in which the detected amount of clearance is less than a predetermined threshold; detecting a pair of closest points having a minimum amount of clearance therebetween, in the detected near-miss section; setting an intermediate teaching point to which the closest points have been moved, along a straight line passing through the detected pair of closest points, until the amount of clearance becomes equal to the threshold; and, while gradually reducing, from the threshold, the amount of clearance at the intermediate teaching point, generating a new operation program that has an intermediate teaching point that provides a maximum amount of clearance at which a new near-miss section is not detected.

Another aspect of the present invention is directed to an automatic path-generation device including: a path search unit that searches, between two given motion points, for a motion path that satisfies a specified amount of clearance between a robot and a peripheral device; and an amount-of-clearance adjustment unit that reduces the amount of clearance if the motion path is not found by the path search unit, wherein the motion path is generated between the motion points by repeating the search for the motion path performed by the path search unit and the reduction of the amount of clearance performed by the amount-of-clearance adjustment unit.

DESCRIPTION OF EMBODIMENT(S) OF THE INVENTION

Figure 1:
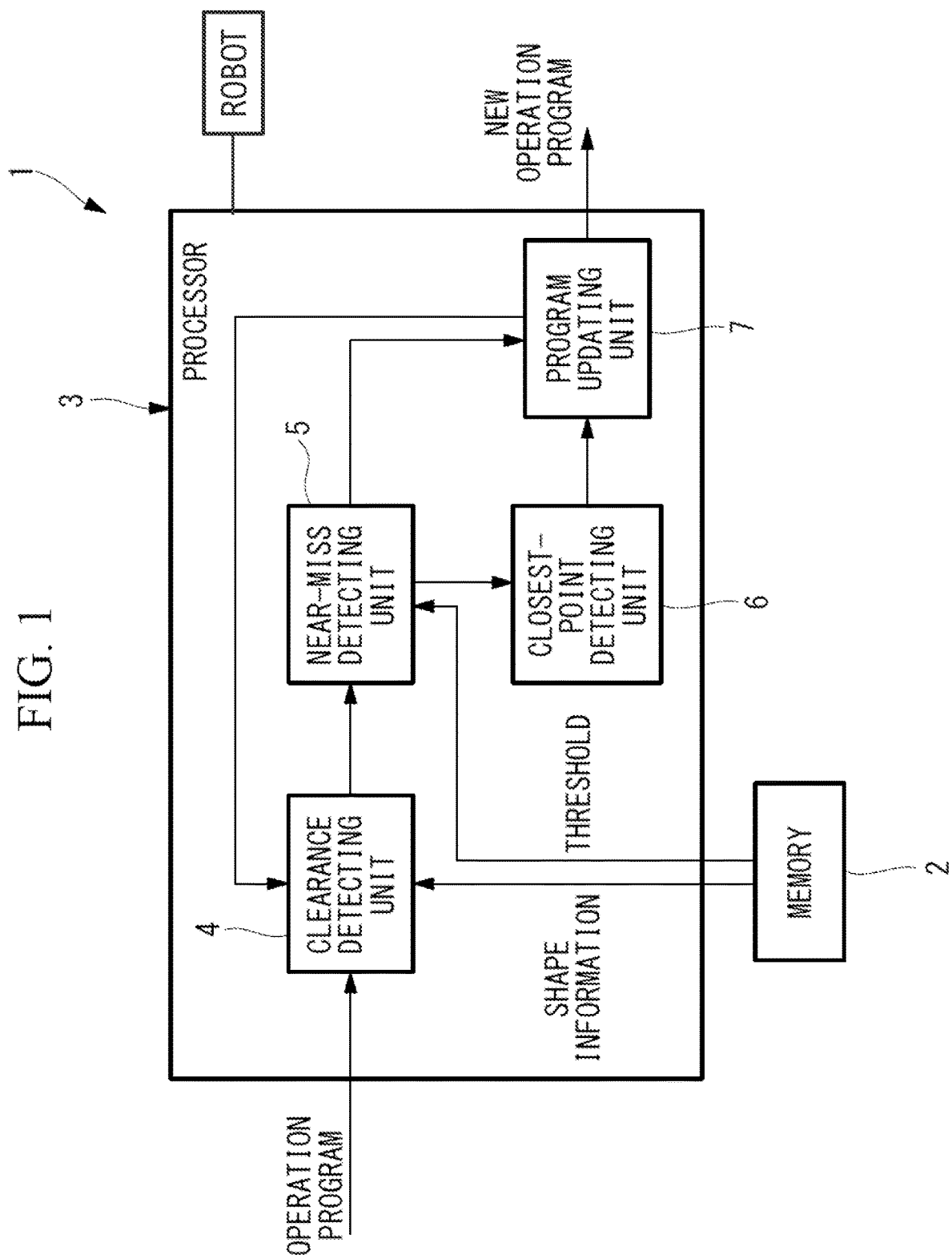
FIG. 1 is a view showing the overall configuration of an automatic program-correction device according to one embodiment of the present invention.

An automatic program-correction device 1 and an automatic program-correction method according to one embodiment of the present invention will be described below with reference to the drawings.

The automatic program-correction device 1 of this embodiment is a device for correcting an existing program through offline work and is provided with: a memory 2 that stores three-dimensional shape information on a robot and a peripheral device, and a recommended amount of clearance; and a processor 3 that performs processing.

The processor 3 is provided with a clearance detecting unit 4 that calculates, upon reception of an existing operation program, a motion path of the robot in accordance with the operation program and that detects, at respective positions in the calculated motion path, the amounts of clearance between an outer surface of the robot and an outer surface of the peripheral device, on the basis of the three-dimensional shape information on the robot and the peripheral device, the information being stored in the memory 2.

In this case, it is assumed that the operation program has a motion path in which the robot can move without interfering with the peripheral device.

Furthermore, the processor 3 is provided with a near-miss detecting unit 5 that compares the amounts of clearance detected by the clearance detecting unit 4 with a threshold stored in the memory 2 and that detects a near-miss section in which the amount of clearance is less than the threshold.

Figure 2:
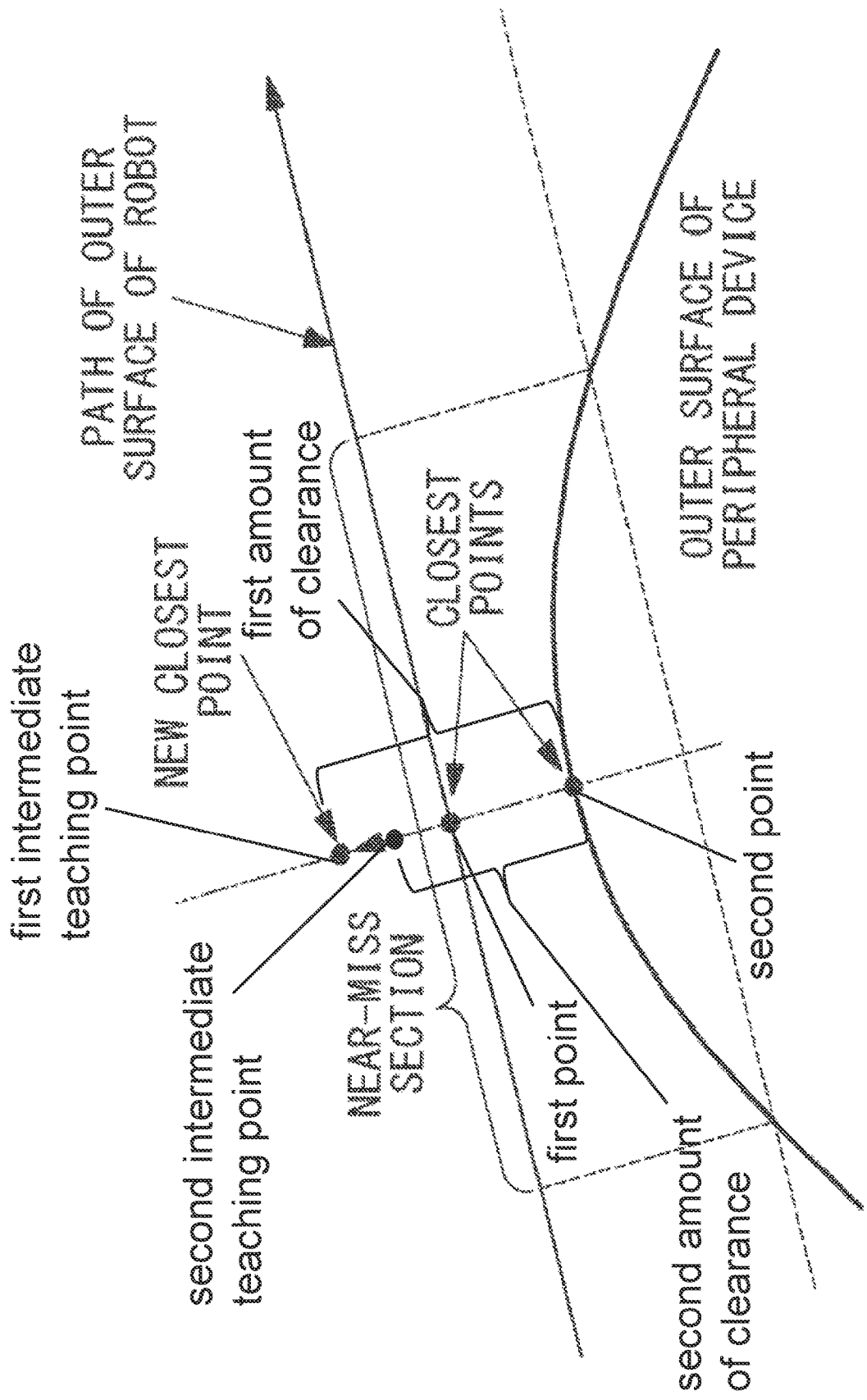
FIG. 2 is a view for explaining a near-miss section and closest points detected by the automatic program-correction device shown in FIG. 1 and a new closest point corresponding to an intermediate teaching point.

For example, as shown in FIG. 2, in a case in which the outer surface of the robot, which moves along the motion path, comes close to the outer surface of the peripheral device beyond the threshold, the corresponding section is detected as a near-miss section.

Furthermore, the processor 3 is provided with a closest-point detecting unit 6 that detects, if near-miss sections are detected by the near-miss detecting unit 5, in each of the detected near-miss sections, a pair of closest points on the outer surface of the robot and on the outer surface of the peripheral device that have the minimum amount of clearance therebetween, as shown in FIG. 2.

Then, the processor 3 is provided with a program updating unit 7 that generates a new operation program having an intermediate teaching point to which the closest point on the outer surface of the robot has been moved, along a straight line passing through the detected pair of closest points, in such a direction as to increase the amount of clearance.

The automatic program-correction method, which uses the thus-configured automatic program-correction device 1 of this embodiment, will be described below.

Figure 3:
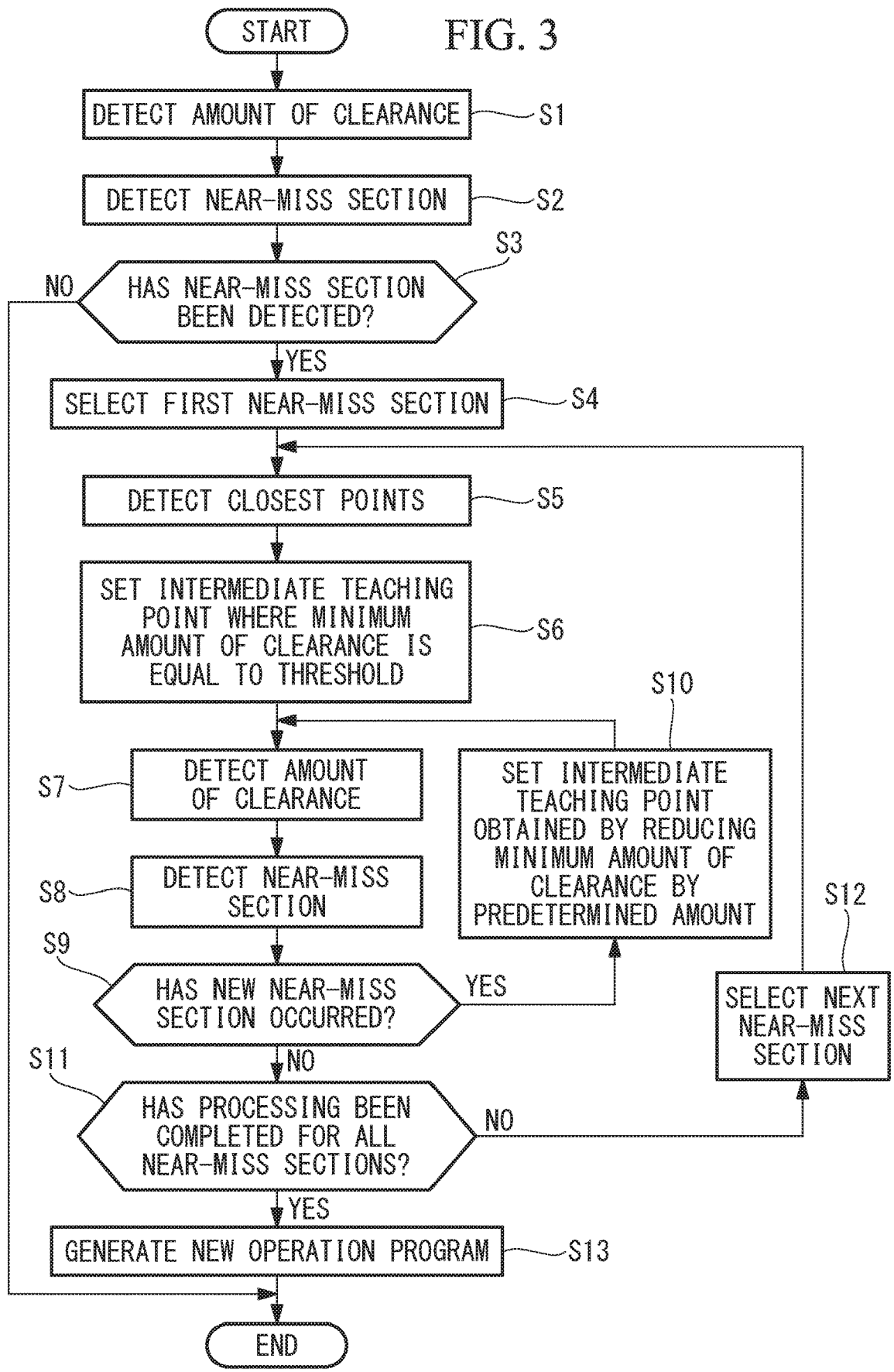
FIG. 3 is a flowchart showing an automatic program-correction method according to the one embodiment of the present invention.

As shown in FIG. 3, in the automatic program-correction method of this embodiment, the clearance detecting unit 4 detects the amount of clearance between the robot and the peripheral device (e.g., between a first point on the motion path and a second point on the peripheral device), at each position in the motion path, on the basis of an input operation program and the stored three-dimensional shape information on the robot and the peripheral device (Step S1).

Next, the near-miss detecting unit 5 detects a near-miss section in which the detected amount of clearance is less than a predetermined threshold (Step S2). Then, it is determined whether a near-miss section has been detected (Step S3). If a near-miss section has not been detected, the processing ends. In Step S3, if a near-miss section has been detected, the first near-miss section is selected (Step S4) (also referred to as the near-miss section with the first amount of clearance), and the closest-point detecting unit 6 detects, in the selected near-miss section, a pair of closest points that have the minimum amount of clearance therebetween (Step S5).

In this state, the program updating unit 7 sets an intermediate teaching point (e.g., a first intermediate teaching point with a first amount of clearance) at a position to which the closest point on the robot has been moved, along a straight line passing through the pair of closest points, until the minimum amount of clearance, which is the distance between the closest points, becomes equal to the threshold (Step S6). In other words, the first intermediate teaching point is set as the first point on the motion path. Then, the amount of clearance is detected at each position in the motion path of the robot set in the operation program, including the new intermediate teaching point (Step S7), and a near-miss section is detected (Step S8).

At this time, it is determined whether a new near-miss section has been detected (Step S9) (also referred to as the near-miss section with the second amount of clearance). If a new near-miss section has been detected, an intermediate teaching point (e.g., a second intermediate teaching point with a second amount of clearance) obtained by reducing the minimum amount of clearance by a predetermined amount is set (Step S10), and the steps from Step S7 are repeated.

Specifically, if a new near-miss section occurs as a result of extending the minimum amount of clearance between the closest points to the threshold (i.e., setting the first intermediate teaching point as the first point on the motion path), it is conceivable that, because the minimum amount of clearance has been extended excessively, the distance between another part of the robot and another peripheral device, for example, is reduced beyond the threshold. Therefore, while the minimum amount of clearance that has been once increased to the threshold is being gradually reduced, detection of the amount of clearance and detection of a near-miss section are performed, thereby making it possible to set an intermediate teaching point that does not cause a new near-miss section (i.e., setting the second intermediate teaching point as the first point on the motion path).

Then, if a new near-miss section has not been detected in Step S9, it is determined whether the processing has been completed for all near-miss sections (Step S11). If the processing has not been completed, the next near-miss section is selected (Step S12), and the steps from Step S5 are repeated.

If the processing has been completed for all near-miss sections, a new operation program that has the set intermediate teaching point is generated (Step S13).

In this way, according to the automatic program-correction device 1 and the automatic program-correction method of this embodiment, because the minimum amount of clearance is not fixed, there is an advantage in that it is possible to generate an operation program by finding a motion path in which the robot and the peripheral object do not interfere with each other, even if a motion path that satisfies a fixed amount of clearance is not found.

Note that, in this embodiment, although, if a new near-miss section has been detected in Step S9, an intermediate teaching point obtained by reducing the minimum amount of clearance by the predetermined amount is immediately set, instead of this, it is also possible to search for a new intermediate teaching point a predetermined number of times while maintaining the minimum amount of clearance, and thereafter, to reduce the minimum amount of clearance.

Figure 4:
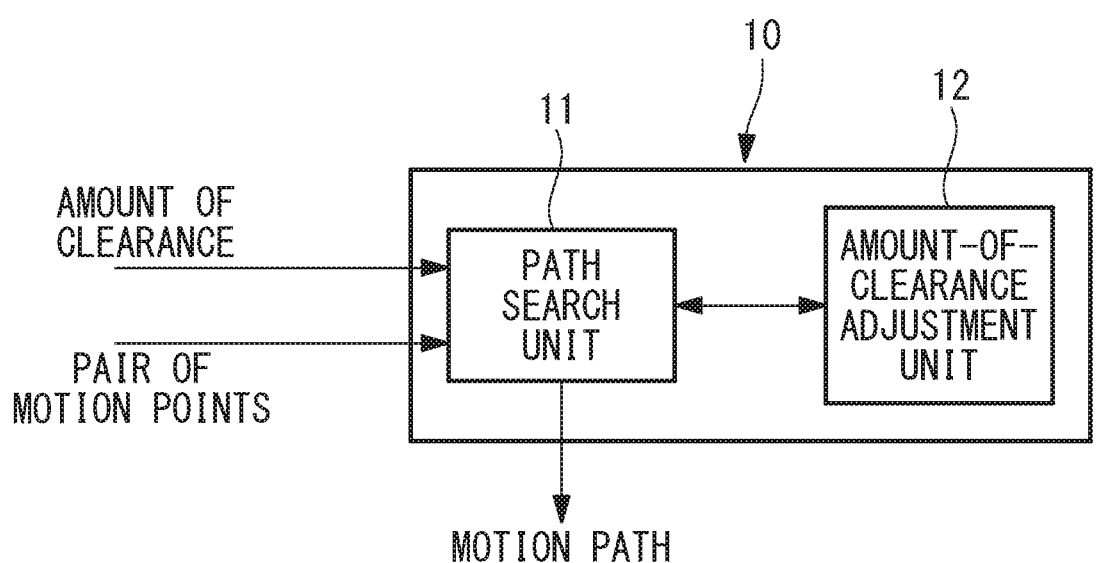
FIG. 4 is a view showing an automatic path-generation device according to the one embodiment of the present invention.

Furthermore, as shown in FIG. 4, an automatic path-generation device 10 according to the one embodiment of the present invention is provided with a path search unit 11 and an amount-of-clearance adjustment unit 12.

Figure 5:
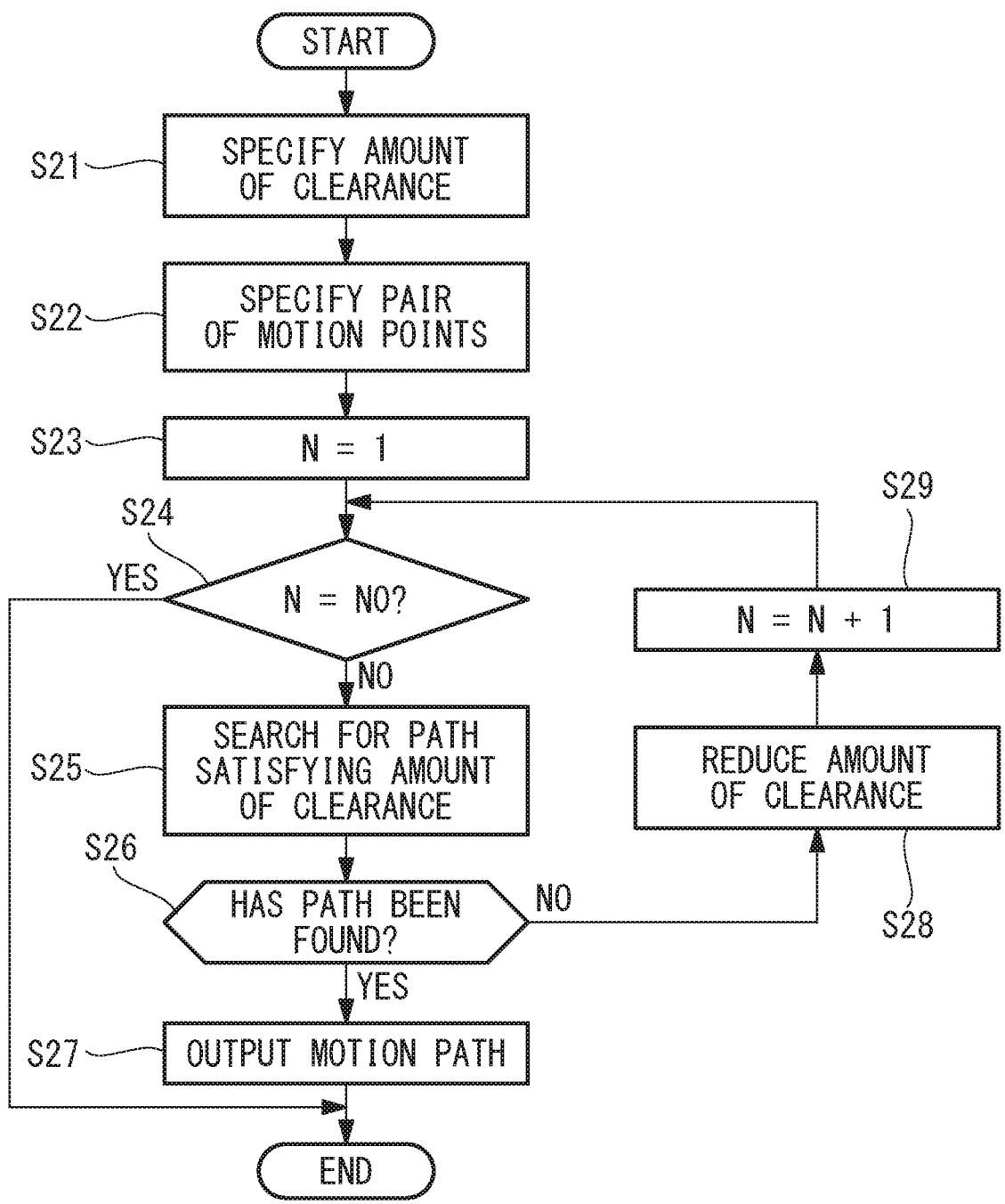
FIG. 5 is a flowchart for explaining the operation of the automatic path-generation device shown in FIG. 4.

As shown in FIG. 5, in the path search unit 11, when the amount of clearance is specified (Step S21), and a pair of motion points are specified (Step S22), a counter N is initialized (Step S23), and it is determined whether the counter is equal to a predetermined value NO (Step S24). If N is equal to NO, the processing ends. If N is not equal to NO, a known method is used to search, between the specified motion points, for a motion path in which the clearance between the robot and a peripheral device is equal to or greater than the specified amount of clearance (Step S25).

Next, the path search unit 11 determines whether a desired motion path has been found (Step S26) and, if a desired motion path has been found, outputs the motion path (Step S27).

If a desired motion path has not been found, the amount-of-clearance adjustment unit 12 reduces the amount of clearance by a predetermined amount (Step S28). The counter is incremented (Step S29), and the steps from Step S24 are repeated.

By doing so, there is an advantage in that it is possible to find a motion path in which the robot and a peripheral object do not interfere with each other, even in a case in which a motion path that satisfies the specified amount of clearance is not found.

Note that, if a desired motion path has not been found by the path search unit 11, when part of the path that satisfies the specified amount of clearance has been found in the certain part of the path between the pair of motion points, the search need not be performed again in the found part of the path that satisfies the specified amount of clearance, and, only in the other part of the path that does not satisfy the specified amount of clearance, the amount of clearance may be reduced by a predetermined amount by the amount-of-clearance adjustment unit 12 (Step S28), the counter may be incremented (Step S29), and the steps from Step S24 may be repeated.

Furthermore, when the path search is performed between two points, some intermediate points are automatically generated. Accordingly, there is a case in which a path that satisfies the specified amount of clearance is found between a certain intermediate point and the next intermediate point, and a path that satisfies the specified amount of clearance is not found between the next intermediate point and the one after the next intermediate point. In this case, with the use of the above-described method, in the section where a path that satisfies the specified amount of clearance is found, the path is used as it is, and, in sections from the next intermediate point to the one after the next intermediate point, from the start point to the intermediate point, and from the one after the next intermediate point to the end point, where such a path is not found, such a path is searched for while reducing the amount of clearance, thus making it possible to generate an operation program by finding a motion path having an amount of clearance that is as large as possible.

As a result, the above-described embodiment leads to the following aspects.

One aspect of the present invention is directed to an automatic program-correction device including: a clearance detecting unit that detects, at each position in a motion path of a robot set in an existing operation program, an amount of clearance between the robot and a peripheral device; a near-miss detecting unit that detects a near-miss section in which the detected amount of clearance is less than a predetermined threshold; a closest-point detecting unit that detects a pair of closest points having a minimum amount of clearance therebetween, in the detected near-miss section; and a program updating unit that generates a new operation program having an intermediate teaching point at a position to which the closest points have been moved, along a straight line passing through the detected pair of closest points, until the amount of clearance becomes greater than the minimum amount of clearance and equal to or less than the threshold, wherein, while gradually reducing, from the threshold, the amount of clearance at the intermediate teaching point, the program updating unit obtains an intermediate teaching point that provides a maximum amount of clearance at which a new near-miss section is not detected.

According to this aspect, in a state in which shape information on a robot and shape information on a peripheral device are stored, when an existing operation program is input, the clearance detecting unit detects the amount of clearance between the robot and the peripheral device, at each position in a motion path of the robot set in the input operation program. The near-miss detecting unit determines whether the detected amount of clearance is less than the predetermined threshold, and, if the detected amount of clearance is less than the predetermined threshold, detects the corresponding section as a near-miss section.

Then, if a near-miss section has been detected, the closest-point detecting unit detects, in the near-miss section, a pair of closest points that have the minimum amount of clearance therebetween, and the program updating unit generates, on a straight line passing through the detected pair of closest points, an intermediate teaching point that provides an amount of clearance equal to the threshold. The program updating unit determines whether a near-miss section different from the detected near-miss section has been detected, in a new motion path passing through the set intermediate teaching point. If such a near-miss section has been detected, the amount of clearance at the intermediate teaching point is reduced by a predetermined amount and is set, and the above-described operation is repeated.

Accordingly, a new operation program that has an intermediate teaching point that provides an amount of clearance larger than the minimum amount of clearance detected at the pair of closest points is generated, thus improving the near miss state between the robot and the peripheral device.

Specifically, in a case in which the amount of clearance is fixed to the threshold or greater, a motion path that satisfies the amount of clearance is not found in some cases; however, by attaining the amount of clearance that is less than the threshold and that is as close to the threshold as possible, it is possible to generate a new operation program by finding a motion path in which the robot and the peripheral object do not interfere with each other.

Another aspect of the present invention is directed to an automatic program-correction device including: a processor; and a memory, wherein the processor detects, at each position in a motion path of a robot set in an existing operation program, an amount of clearance between the robot and a peripheral device; detects a near-miss section in which the detected amount of clearance is less than a predetermined threshold stored in the memory; detects a pair of closest points having a minimum amount of clearance therebetween, in the detected near-miss section; sets an intermediate teaching point to which the closest points have been moved, along a straight line passing through the detected pair of closest points, until the amount of clearance becomes equal to the threshold; and, while gradually reducing, from the threshold, the amount of clearance at the intermediate teaching point, generates a new operation program that has an intermediate teaching point that provides a maximum amount of clearance at which a new near-miss section is not detected.

Another aspect of the present invention is directed to an automatic program-correction method including the steps of: detecting, at each position in a motion path of a robot set in an existing operation program, an amount of clearance between the robot and a peripheral device; detecting a near-miss section in which the detected amount of clearance is less than a predetermined threshold; detecting a pair of closest points having a minimum amount of clearance therebetween, in the detected near-miss section; setting an intermediate teaching point to which the closest points have been moved, along a straight line passing through the detected pair of closest points, until the amount of clearance becomes equal to the threshold; and, while gradually reducing, from the threshold, the amount of clearance at the intermediate teaching point, generating a new operation program that has an intermediate teaching point that provides a maximum amount of clearance at which a new near-miss section is not detected.

Another aspect of the present invention is directed to an automatic path-generation device including: a path search unit that searches, between two given motion points, for a motion path that satisfies a specified amount of clearance between a robot and a peripheral device; and an amount-of-clearance adjustment unit that reduces the amount of clearance if the motion path is not found by the path search unit, wherein the motion path is generated between the motion points by repeating the search for the motion path performed by the path search unit and the reduction of the amount of clearance performed by the amount-of-clearance adjustment unit.

According to the present invention, an advantageous effect is afforded in that it is possible to generate an operation program by finding a motion path in which a robot and a peripheral object do not interfere with each other, even in a case in which a motion path that satisfies a fixed amount of clearance is not found.

The invention claimed is:
1. A system, comprising:
a robot;
a peripheral device; and
an automatic program-correction device for a motion path for the robot around the peripheral device, comprising:
a processor; and
a memory connected to the processor, wherein the memory stores shape information about the robot and the peripheral device,
wherein the processor comprises:
a clearance detecting unit that detects an amount of clearance between a first point and a second point at each position in the motion path of the robot, wherein the first point is on the motion path and the second point is on the peripheral device,
a near-miss detecting unit, connected to the clearance detecting unit, that detects a near-miss section, wherein the near-miss section encompasses a portion of the motion path where the amount of clearance is less than a predetermined threshold stored in the memory,
a closest-point detecting unit, connected to the near-miss detecting unit, that detects a minimum of the amount of clearance between the first point and the second point at each position in the detected near-miss section, and
a program updating unit connected to the near-miss detecting unit;
wherein, when the near-miss section is detected by the near-miss detecting unit, the program updating unit generates a first intermediate teaching point and sets the first intermediate teaching point as the first point in the motion path at which the minimum amount of clearance was detected,
wherein the first intermediate teaching point defines a first amount of clearance between the first intermediate teaching point and the second point in the motion path at which the minimum amount of clearance was detected,
wherein the first amount of clearance is greater than the minimum amount of clearance,
wherein the first amount of clearance is equal to or less than the predetermined threshold,
wherein, when the near-miss detecting unit does not detect a new near-miss section in a motion path of the robot passing through the first intermediate teaching point, the program updating unit selects the motion path to cause the robot to pass through the first intermediate teaching point,
wherein, when the near-miss detecting unit detects a new near-miss section in a motion path of the robot passing through the first intermediate teaching point, the program updating unit reduces the first amount of clearance to obtain a second intermediate teaching point,
wherein the second intermediate teaching point defines a second amount of clearance between the second intermediate teaching point and the second point in the motion path at which the minimum amount of clearance was detected,
wherein the second amount of clearance is less than the first amount of clearance, and
when the near-miss detecting unit does not detect a new near-miss section in a motion path of the robot passing through the second intermediate teaching point, the program updating unit selects the motion path for the robot to cause the robot to pass through the second intermediate teaching point.

2. A system, comprising:
a robot;
a peripheral device; and
an automatic program-correction device for a motion path for the robot around the peripheral device, comprising:
a processor; and
a memory connected to the processor, wherein the memory stores shape information about the robot and the peripheral device,
wherein the processor is configured to:
at each position in the motion path of the robot, detect an amount of clearance between a first point and a second point, wherein the first point is on the motion path and the second point is on the peripheral device,
detect a near-miss section, wherein the near-miss section encompasses a portion of the motion path where the amount of clearance is less than a predetermined threshold stored in the memory, and
detect a minimum for the amount of clearance between the first point and the second point at each position in the near-miss section,
wherein, when the near-miss section is detected, generate a first intermediate teaching point and set the first intermediate teaching point as the first point in the motion path at which the minimum amount of clearance was detected,
wherein the first intermediate teaching point defines a first amount of clearance between the first intermediate teaching point and the second point in the motion path at which the minimum amount of clearance was detected,
wherein the first amount of clearance is greater than the minimum amount of clearance,
wherein the first amount of clearance is equal to or less than the predetermined threshold,
wherein, when a new near-miss section in a motion path of the robot passing through the first intermediate teaching point is not detected, the processor is configured to select the motion path to cause the robot to pass through the first intermediate teaching point, wherein, when a new near-miss section in a motion path of the robot passing through the first intermediate teaching point is detected, the processor is configured to reduce the first amount of clearance to obtain a second intermediate teaching point and set the second intermediate teaching point as the first point in the motion path at which the minimum amount of clearance was detected, wherein the second intermediate teaching point defines a second amount of clearance between the second intermediate teaching point and the second point in the motion path at which the minimum amount of clearance was detected, wherein the second amount of clearance is less than the first amount of clearance, and wherein, when a new near-miss section in a motion path of the robot passing through the second intermediate teaching point is not detected, the processor is configured to select the motion path for the robot to cause the robot to pass through the second intermediate teaching point.

3. A method, comprising:

providing a robot;

providing a peripheral device;

at each position in the motion path of the robot, detecting an amount of clearance between a first point and a second point, wherein the first point is on the motion path and the second point is on the peripheral device, detecting a near-miss section, wherein the near-miss section encompasses a portion of the motion path where the amount of clearance is less than a predetermined threshold stored in the memory, detecting a minimum for the amount of clearance between the first point and the second point at each position in the near-miss section, wherein, when the near-miss section is detected, generating a first intermediate teaching point and setting the first intermediate teaching point as the first point in the motion path at which the minimum amount of clearance was detected, wherein the first intermediate teaching point defines a first amount of clearance between the first intermediate teaching point and the second point in the motion path at which the minimum amount of clearance was detected, wherein the first amount of clearance is greater than the minimum amount of clearance, wherein the first amount of clearance is equal to or less than the predetermined threshold, wherein, when a new near-miss section in a motion path of the robot passing through the first intermediate teaching point is not detected, selecting the motion path to cause the robot to pass through the first intermediate teaching point, wherein, when a new near-miss section in a motion path of the robot passing through the first intermediate teaching point is detected, reducing the first amount of clearance to obtain a second intermediate teaching point and setting the second intermediate teaching point as the first point in the motion path at which the minimum amount of clearance was detected, wherein the second intermediate teaching point defines a second amount of clearance between the second intermediate teaching point and the second point in the motion path at which the minimum amount of clearance was detected, wherein the second amount of clearance is less than the first amount of clearance, and wherein, when a new near-miss section in a motion path of the robot passing through the second intermediate teaching point is not detected, selecting the motion path for the robot to cause the robot to pass through the second intermediate teaching point.

\* \* \* \* \*